(12) United States Patent
Tachibanada et al.

(10) Patent No.: US 10,344,852 B2
(45) Date of Patent: Jul. 9, 2019

(54) CONTROL APPARATUS AND CONTROL SYSTEM

(71) Applicant: HONDA MOTOR CO., LTD., Tokyo (JP)

(72) Inventors: Yuya Tachibanada, Wako (JP); Masaya Agata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/877,581

(22) Filed: Jan. 23, 2018

(65) Prior Publication Data

US 2018/0216726 A1 Aug. 2, 2018

(30) Foreign Application Priority Data

Jan. 31, 2017 (JP) .................................. 2017-016074

(51) Int. Cl.

| F16H 61/12 | (2010.01) |
|---|---|
| F16H 61/02 | (2006.01) |
| F16H 61/04 | (2006.01) |
| F16H 59/44 | (2006.01) |
| F02D 41/04 | (2006.01) |
| F02D 41/02 | (2006.01) |
| F16H 61/4192 | (2010.01) |
| F16H 61/686 | (2006.01) |

(52) U.S. Cl.
CPC ..... *F16H 61/0213* (2013.01); *F02D 41/0215* (2013.01); *F02D 41/04* (2013.01); *F16H 59/44* (2013.01); *F16H 61/04* (2013.01); *F16H 61/12* (2013.01); *F02D 2200/1004* (2013.01); *F02D 2400/12* (2013.01); *F16H 61/4192* (2013.01); *F16H 61/686* (2013.01)

(58) Field of Classification Search
None
See application file for complete search history.

(56) References Cited

U.S. PATENT DOCUMENTS 4,732,055 A * 3/1988 Tateno .................... F16H 59/54
477/73
5,076,116 A * 12/1991 Sasaki ................. F16H 61/0213
477/120

(Continued)

FOREIGN PATENT DOCUMENTS

| JP | H6-280629 A | 10/1994 |
| JP | H10-141099 A | 5/1998 |

(Continued)

*Primary Examiner* — Justin Holmes
(74) *Attorney, Agent, or Firm* — Thomas | Horstemeyer, LLP (57) ABSTRACT

A control apparatus configured to control an automatic transmission to which a driving force of an engine is input includes a detection unit provided in the automatic transmission, and a processing unit configured to generate load information concerning a load on the automatic transmission based on the detection result of the detection unit and transmit the load information to the control apparatus of the engine. The processing unit transmits dummy information that is not based on the detection result of the detection unit as the load information at least on condition that the automatic transmission is in an operation state in which a load on an input shaft is released.

10 Claims, 8 Drawing Sheets

(56) References Cited

U.S. PATENT DOCUMENTS

| | | | |
|---|---|---|---|
| 10,093,319 B2* | 10/2018 | Ono | B60W 10/02 |
| 2005/0246084 A1* | 11/2005 | Buckley | F16H 59/14 |
| | | | 701/51 |
| 2008/0234105 A1* | 9/2008 | Sakamoto | F16H 61/12 |
| | | | 477/124 |

FOREIGN PATENT DOCUMENTS

| | | |
|---|---|---|
| JP | H11-62652 | 3/1999 |
| JP | 2010-84691 A | 4/2010 |

* cited by examiner

|  | C1 | C2 | C3 | B1 | B2 | B3 | F1 | GEAR RATIO |
|---|---|---|---|---|---|---|---|---|
| RVS |  |  | ○ |  | ○ |  | ○ | 4.008 |
| 1st |  |  |  | ○ | ○ | (○) | △/○ | 5.233 |
| 2nd |  | ○ |  | ○ | ○ |  | (△) | 3.367 |
| 3rd |  |  | ○ | ○ | ○ |  | (△) | 2.298 |
| 4th |  | ○ | ○ | ○ |  |  | (△) | 1.705 |
| 5th | ○ |  | ○ | ○ |  |  | (△) | 1.363 |
| 6th | ○ | ○ | ○ |  |  |  | (△) | 1.000 |
| 7th | ○ |  | ○ |  | ○ |  | (△) | 0.786 |
| 8th | ○ | ○ |  |  | ○ |  | (△) | 0.657 |
| 9th | ○ |  |  | ○ | ○ |  | (△) | 0.584 |
| 10th | ○ | ○ |  |  |  | ○ | (△) | 0.520 |
| P/N |  |  |  |  |  |  | △/○ | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

CONTROL APPARATUS AND CONTROL SYSTEM

CROSS-REFERENCE TO RELATED APPLICATION

This application is based upon and claims the benefit of priority from the prior Japanese Patent Application No. 2017-016074, filed on Jan. 31, 2017, the entire contents of which are incorporated herein by reference.

BACKGROUND OF THE INVENTION

Field of the Invention

The present invention relates to a control technique of a vehicle.

Description of the Related Art

There have been proposed systems each of which controls an engine by communication between a control apparatus that controls an automatic transmission and a control apparatus that controls the engine (for example, Japanese Patent Laid-Open Nos. 6-280629, 2010-84691, 11-62652, and 10-141099).

In a state such as a neutral range or parking range in which a load on the input shaft of an automatic transmission is released, a variation in the engine speed sometimes readily influences the load calculation of the automatic transmission. When information about the load on the automatic transmission is transmitted from the automatic transmission side to the engine and used to control the engine, the engine speed is unstable in some cases.

SUMMARY OF THE INVENTION

It is an object of the present invention to improve the stability of an engine speed in a state in which a load on the input shaft of an automatic transmission is released.

According to an aspect of the present invention, there is provided a control apparatus configured to control an automatic transmission to which a driving force of an engine is input, comprising: a detection unit provided in the automatic transmission; and a processing unit configured to generate load information concerning a load on the automatic transmission based on a detection result of the detection unit and transmit the load information to a control apparatus of the engine, wherein the processing unit transmits dummy information that is not based on the detection result of the detection unit as the load information at least on condition that the automatic transmission is in an operation state in which a load on an input shaft of the automatic transmission is released.

According to another aspect of the present invention, there is provided a control system comprising: a first control apparatus configured to control an engine; and a second control apparatus configured to control an automatic transmission to which a driving force of the engine is input, wherein the second control apparatus comprises: a detection unit provided in the automatic transmission; and a processing unit configured to generate load information concerning a load on the automatic transmission based on a detection result of the detection unit and transmit the load information to the first control apparatus, the first control apparatus executes driving control of the engine based on the load information, and the processing unit transmits dummy information that is not based on the detection result of the detection unit as the load information at least on condition that the automatic transmission is in an operation state in which a load on an input shaft of the automatic transmission is released.

Further features of the present invention will become apparent from the following description of exemplary embodiments (with reference to the attached drawings).

DESCRIPTION OF THE EMBODIMENTS

Figure 1:
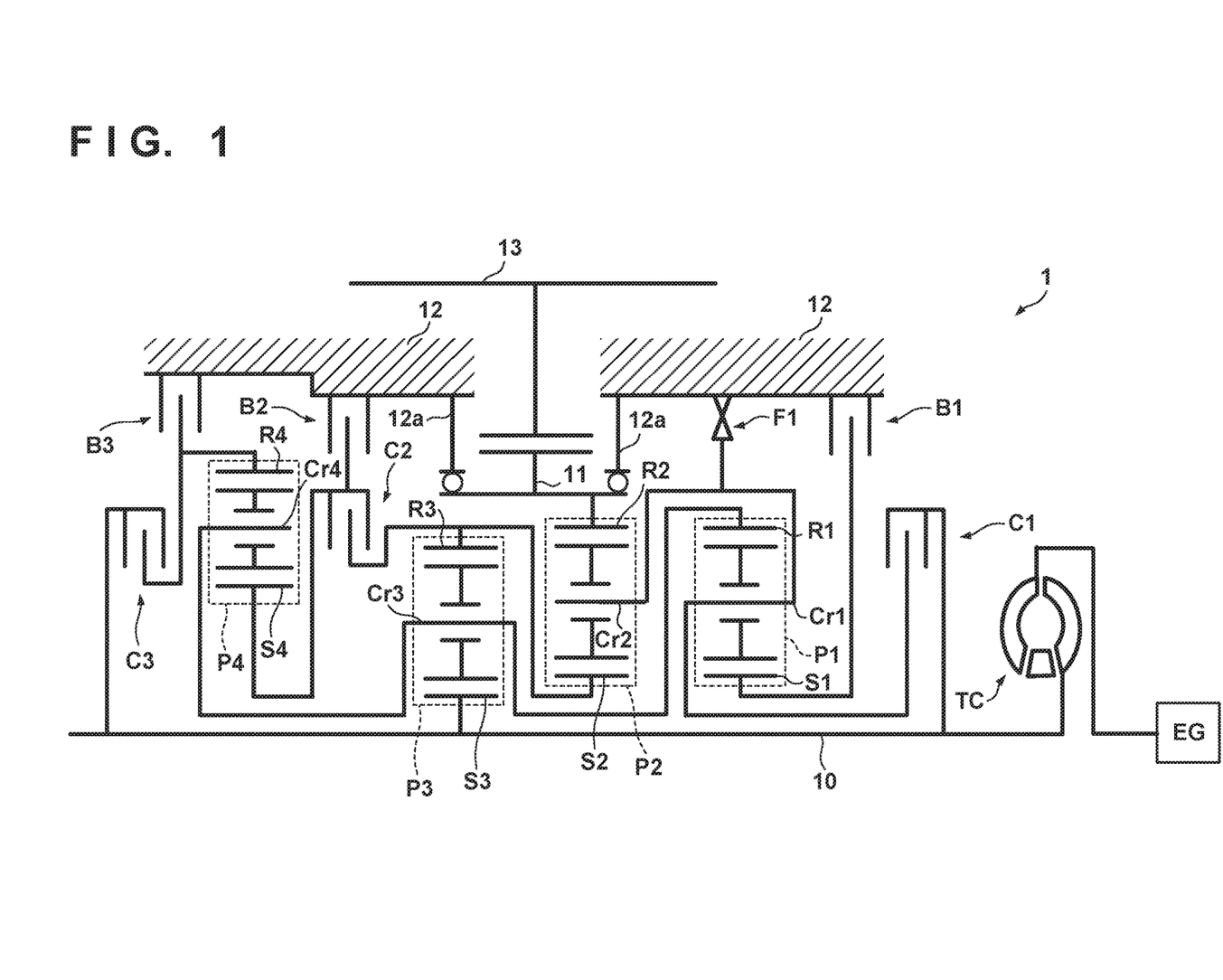
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an engine EG (to be sometimes simply referred to as EG) that is an internal combustion engine is input to the input shaft 10, and the input shaft 10 is rotated by the driving force. A starting device is provided between the input shaft 10 and the engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the engine EG is input to the input shaft 10 through the torque converter TC.

The output member 11 includes a gear concentric to the input shaft 10. The output shaft 13 includes a gear that meshes with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

Figure 2A:
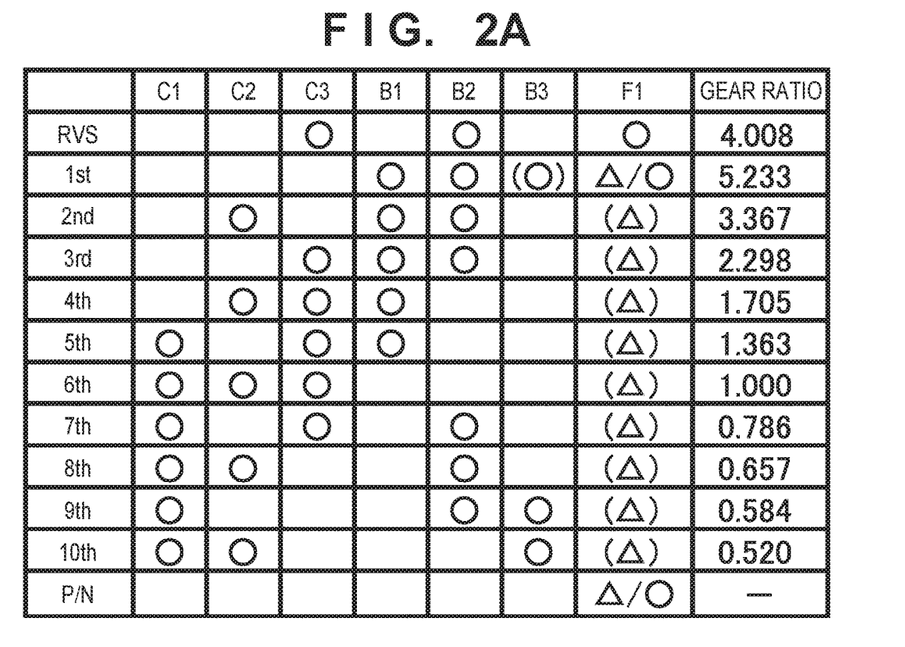
FIG. 2A is a view showing an example of the engagement table of engaging mechanisms.
Figure 2B:
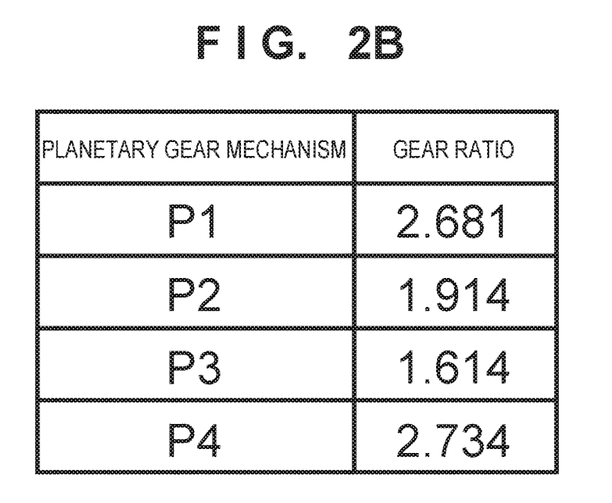
FIG. 2B is a view showing the gear ratios of planetary gear mechanisms.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, a running range that transmits the driving force to the wheel side and a non-running range that does not transmit the driving force are included in selectable shift ranges. In the running range, 10 forward ranges (1st to 10th) and one reverse range (RVS) can be established. "P/N" represents non-running ranges; "P", a parking range; and "N", a neutral range.

In the example of the engaging table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the brake F1, "○" indicates the rotation inhibition state, and "Δ" indicates the one-way rotation permission state. In the first range (1st), the brake F1 can be set in either the rotation inhibition state or the one-way rotation permission state. In the rotation inhibition state, the engine brake is enabled. In the first range, the brake F1 is set in the one-way rotation permission state. The engine brake is switched between the enabled state and a disabled state by engaging or releasing the brake B3. In FIG. 2A, "○" of the brake B3 in the first range (1st) indicates this.

An algorithm to determine which state is set for the brake F1 in the first range (1st) can appropriately be designed. In this embodiment, the state before a change to the first range (1st) is inherited. For example, when changed from the reverse range (RVS) to the first range (1st), the engaging mechanism F1 remains in the rotation inhibition state in the first range (1st). However, if, for example, the vehicle speed exceeds a predetermined speed, the engaging mechanism F1 is switched to the one-way rotation permission state. Similarly, when changed from other forward ranges (2nd to 10th) to the first range (1st), the engaging mechanism F1 remains in the one-way rotation permission state in the first range (1st).

In the non-running ranges (P/N) as well, the state of the brake F1 can be either the rotation inhibition state or the one-way rotation permission state. In this embodiment, the state before a change to the non-running ranges (P/N) is inherited, as in the first range (1st).

In the second range (2nd) to the 10th range (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the second range (2nd) to the 10th range (10th).

Note that in this embodiment, the one-way rotation permission state is selected as the state of the brake F1 in each of the second range (2nd) to the 10th range (10th), and these ranges cannot be established in the rotation inhibition state. However, an arrangement that selects the rotation inhibition state can also be employed depending on the arrangement of the automatic transmission 1.

Figure 3:
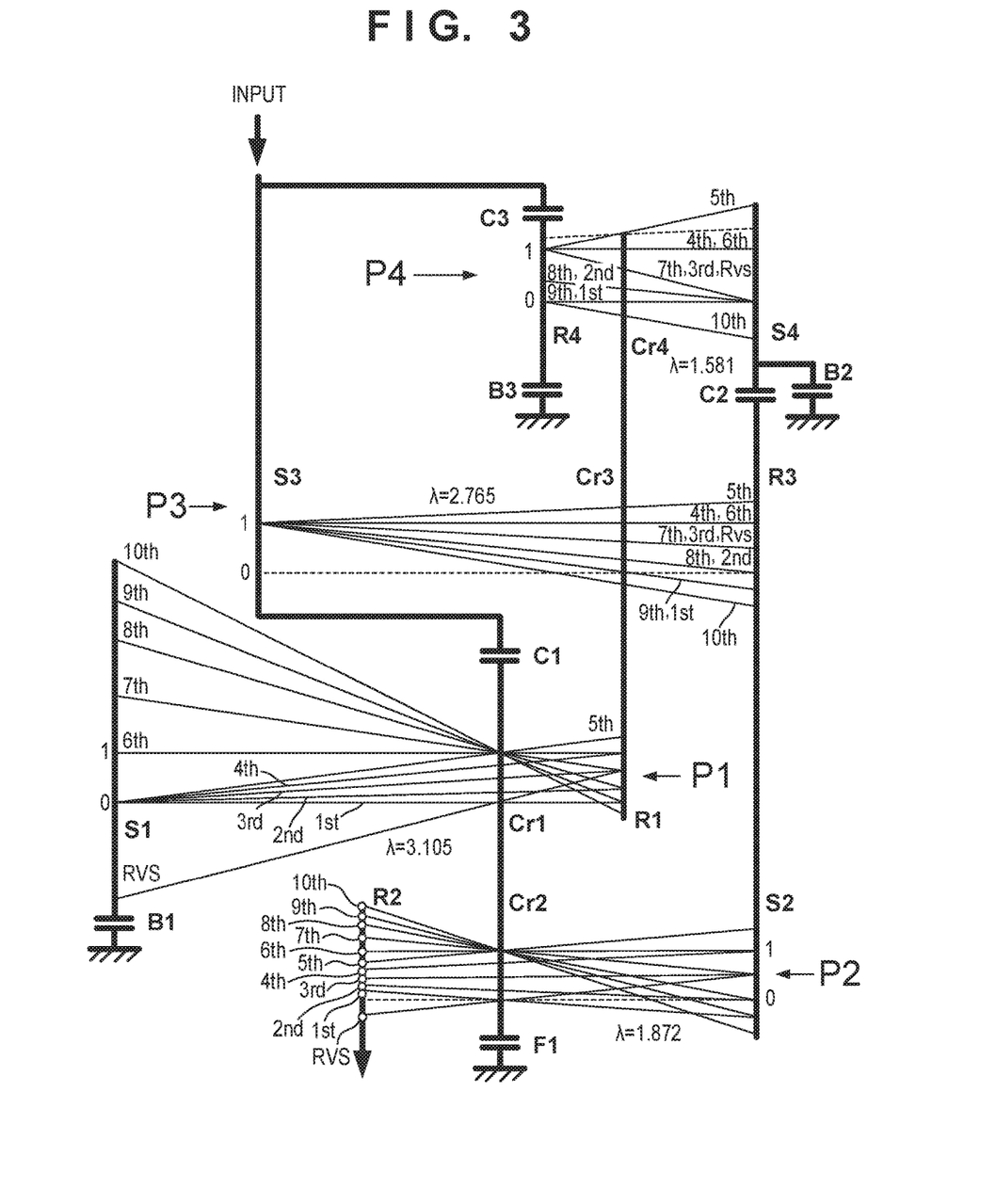
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control System>

Figure 4:
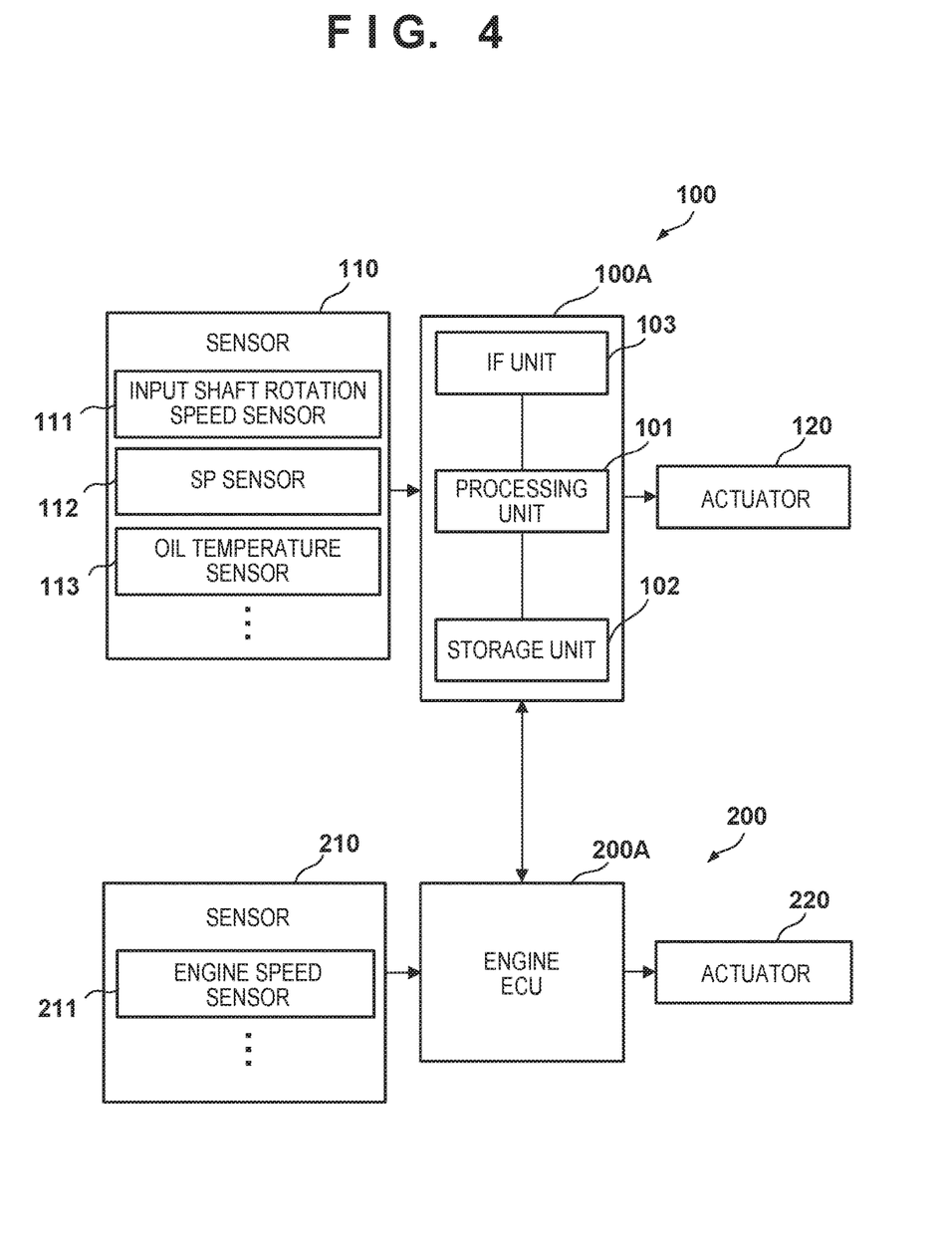
FIG. 4 is a block diagram of a control system.

FIG. 4 is a block diagram of the control system of the automatic transmission 1 and the engine EG. The system includes a control apparatus 100 that controls the automatic transmission 1 including the torque converter TC, and a control apparatus 200 that controls the engine EG.

The control apparatus 100 includes an ECU 100A as a control unit. The ECU 100A includes a processing unit 101 such as a CPU, a storage unit 102 such as a RAM and ROM, and an IF unit 103 that interfaces between the processing unit 101 and an external device or an ECU 200A on the engine side. The IF unit 103 is formed from, for example, a communication interface or an input/output interface.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4 illustrates the following sensors. An input shaft rotation speed sensor 111 is a sensor that detects the rotation speed of the input shaft 10. The rotation speed of the input shaft 10 will sometimes be referred to as an input shaft rotation speed. An SP sensor (shift position sensor) 112 is a sensor that detects a shift position selected by the driver. In this embodiment, four types of shift positions, that is, P range (parking range), D range (forward range), N range (neutral range), and R range (reverse range) are assumed. If the D range is selected, the processing unit 101 selects one of the first range (1st) to the 10th range (10th) in accordance with a gear change map stored in the storage unit 102 and changes the gear. If the R range is selected, the processing unit 101 selects the reverse range. An oil temperature sensor 113 detects the temperature of hydraulic oil in the automatic transmission 1.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1.

The control apparatus 200 includes the ECU 200A as a control unit. Like the ECU 100A, the ECU 200A includes a processing unit such as a CPU, a storage unit such as a RAM and ROM, and an IF unit that interfaces between the processing unit and an external device or the ECU 100A. The IF unit is formed from, for example, a communication interface or an input/output interface. The ECU 100A and the ECU 200A can transmit/receive information.

Various kinds of sensors 210 include various kinds of sensors provided in the engine EG. An engine speed sensor 211 is illustrated in FIG. 4. The engine speed sensor 211 is a sensor that detects the engine speed of the engine EG, that is, the rotation speed input from the engine EG to the torque converter TC. The engine speed of the engine EG will sometimes be referred to as an actual engine speed. The various kinds of sensors 210 also include sensors necessary for the control of the engine EG, such as a sensor that detects an accelerator position. Various kinds of actuators 220 include various kinds of actuators provided in the engine EG. For example, a fuel injection device and the like are included.

The ECU 200A controls the various kinds of actuators 220 based on the detection results of the various kinds of sensors 210. In control processing of the engine EG, the ECU 200A sets the target engine speed of the engine EG (to be sometimes referred to as a target engine speed) from the viewpoint of control. In this embodiment, the ECU 200A transmits information including the actual engine speed detected by the engine speed sensor 211 and the set target engine speed to the ECU 100A. Note that an arrangement in which the ECU 100A is electrically connected to the engine speed sensor 211, and the ECU 100A acquires the actual engine speed of the engine EG without the intervention of the ECU 200A can also be employed.

The ECU 100A can calculate a slip ratio: ETR of the torque converter TC in a non-lockup state from the actual engine speed and the input shaft rotation speed, which is given by $$ETR\ (\%)=(\text{input shaft rotation speed [rpm]}/(\text{actual engine speed [rpm]})\times 100$$

Figure 5:
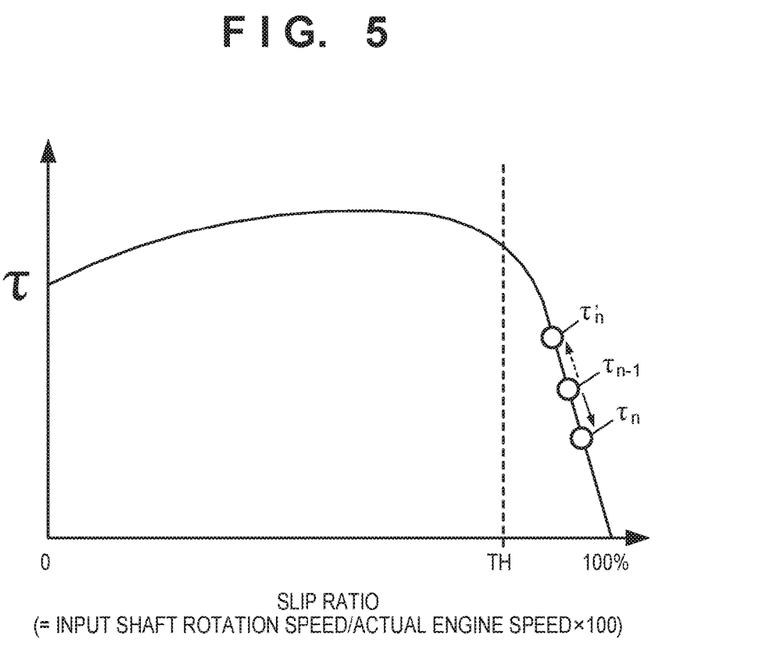
FIG. 5 is an explanatory view of the characteristic value of a torque converter.

The ECU 100A transmits information (load information) concerning the load on the automatic transmission 1 to the ECU 200A as information used by the ECU 200A to do engine control. In this embodiment, the load information represents the load on the torque converter TC. In this embodiment, the load on the torque converter TC is calculated by $$\text{load}=\tau\times(\text{target engine speed [rpm]}/1000)^2$$

where τ is the characteristic value (capacity coefficient) of the torque converter TC, and is specified by a map prepared for each oil temperature of the torque converter TC or for each actual engine speed. FIG. 5 shows an example of the map. The storage unit 102 store the data of such a map, and the processing unit 101 reads out the map and specifies the characteristic value τ.

The characteristic value τ is a function of (input shaft rotation speed/actual engine speed). By obtaining the characteristic value τ from the input shaft rotation speed and the actual engine speed, the actual engine speed can be calculated at a high accuracy while reflecting the influence of a low oil temperature, variations between individual transmissions, or aged deterioration of parts. In the example shown in FIG. 5, a change in τ is shown by plotting the slip ratio along the abscissa for the sake of convenience. In a region where the slip ratio exceeds a threshold TH and is close to 100%, the change in the characteristic value τ is large relative to the change in the slip ratio. The threshold TH is, for example, 80%.

In the above-described arithmetic expression of the load, the target engine speed may be the actual engine speed. However, when the target engine speed is used, driving control of the engine EG to the load on the side of the automatic transmission 1 can be performed as feedforward control, and more proper driving control of the engine EG can be performed.

<Example of Control>

An example of control processing executed by the ECU 100A will be described. An example of processing associated with transmission of load information to the ECU 200A will be explained here.

The ECU 200A performs driving control of the engine EG based on load information. Basically, when the load on the torque converter TC represented by load information decreases, the output torque of the engine EG is lowered. When the load on the torque converter TC increases, the output torque of the engine EG is raised.

Here, in an operation state immediately after the load on the input shaft 10 is released, as in a state immediately after the gear range is switched from the running range to a non-running range, the engine speed readily varies because of an abrupt variation in the load on the side of the automatic transmission 1. When the gear range is switched from the running range to a non-running range, the slip ratio of the torque converter TC exceeds the threshold TH, and the variation in the characteristic value τ tends to be large relative to the change in the slip ratio. Normally, when the gear range is switched from the running range to a non-running range, the load on the torque converter TC represented by the load information decreases. Hence, the ECU 200A performs control in a direction to lower the output torque.

Figure 6:
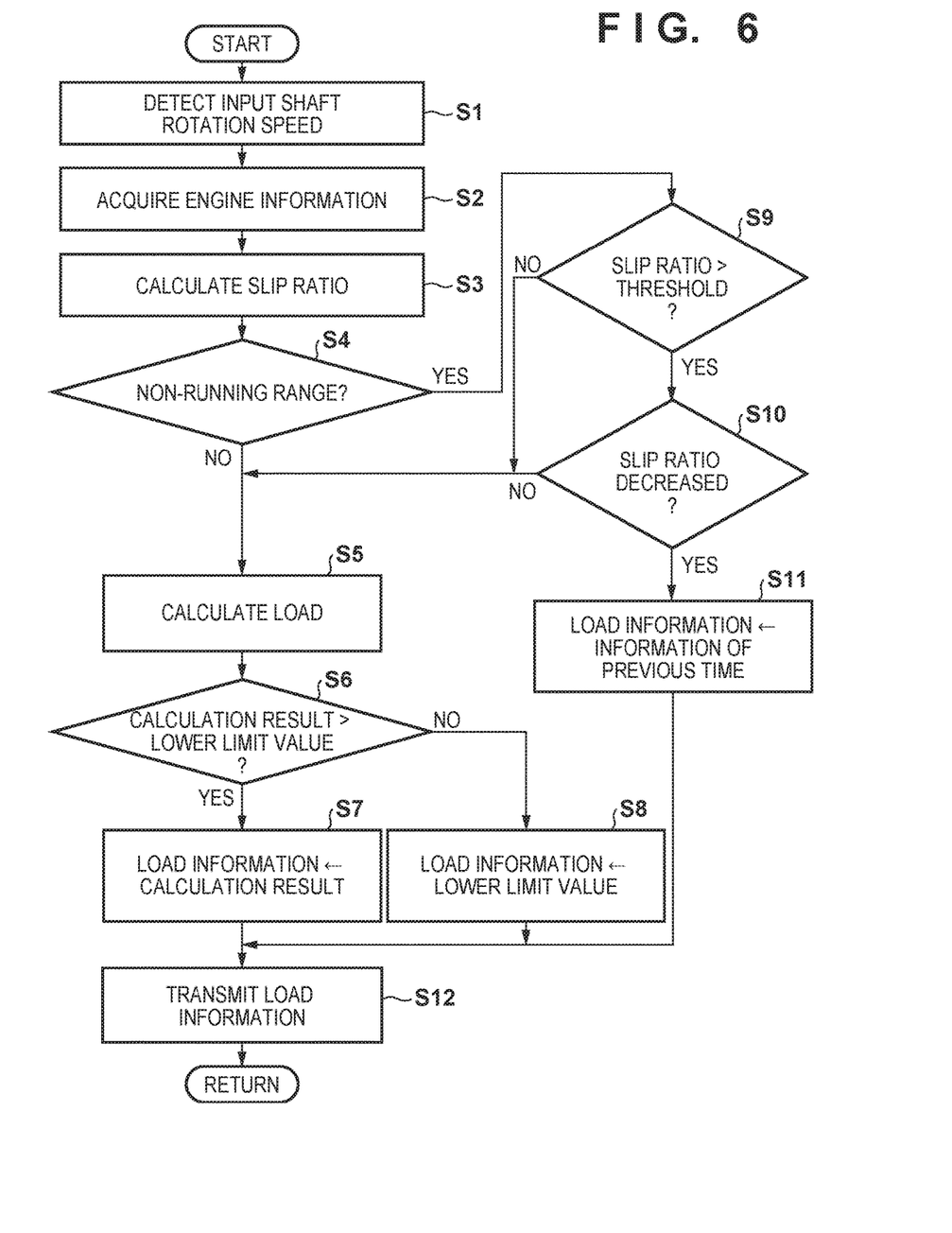
FIG. 6 is a flowchart showing an example of processing of a control apparatus shown in FIG. 4.

However, because of the necessary of maintaining a predetermined engine speed, or the like, the ECU 200A sometimes performs control in a direction to raise the output torque of the engine EG. If the slip ratio decreases as a result, the characteristic value τ increases, and for this reason, the load value represented by the load information transmitted from the ECU 100A to the ECU 200A also increases. As a result, in some cases, the ECU 200A recognizes that the load on the torque converter TC has increased, and performs control in the direction to further raise the output torque of the engine EG, resulting in hunting of the engine speed. As an example of a countermeasure, the ECU 100A executes processing shown in FIG. 6. FIG. 6 shows processing of calculating the load on the torque converter TC and transmitting load information to the ECU 200A by the ECU 100A. This processing is repetitively executed.

In step S1, the ECU 100A acquires the detection result of the input shaft rotation speed sensor. In step S2, the ECU 100A acquires engine information. The engine information includes the actual engine speed and the target engine speed and is received from the ECU 200A. In step S3, the ECU 100A calculates the above-described slip ratio from the input shaft rotation speed acquired in step S1 and the actual engine speed acquired in step S2. In the storage unit 102, an area to store the past calculation results of the slip ratio is allocated. The calculated slip ratio is stored in the storage unit 102 as a calculated value of this time.

In step S4, the ECU 100A determines whether the automatic transmission 1 is in a state in which the load on the input shaft 10 is released. In this embodiment, the ECU 100A determines whether the current running range is a non-running range (the stead state of the neutral or parking range). If YES in step S4, the process advances to step S9. If NO in step S4 (the D range or R range), the process advances to step S5.

In step S5, the ECU 100A calculates the load on the torque converter TC using the above-described arithmetic expression. In step S6, the ECU 100A determines whether the load calculated in step S5 exceeds a lower limit value. If the load exceeds the lower limit value, the process advances to step S7. If the load is equal to or smaller than the lower limit value, the process advances to step S8. The lower limit value suppresses transmission of an excessively low value as the load information and is specified by a map prepared for each oil temperature or target engine speed. The map is stored in the storage unit 102.

In step S7, ECU 100A generates information representing the load calculated in step S5 as the load information of this time to be stored in the storage unit 102. In step S8, the ECU 100A generates information representing the lower limit value used in the determination of step S6 as the load information of this time.

In step S9, the ECU 100A determines whether the slip ratio calculated in step S3 exceeds a threshold. Here, the ECU 100A determines whether the slip ratio calculated in step S3 is located on the side of 100% with respect to the threshold TH described with reference to FIG. 5. If the slip ratio exceeds the threshold TH, the process advances to step S10. If the slip ratio does not exceed the threshold TH, the process advances to step S5. A region where the slip ratio exceeds the threshold TH is a region where the change in the characteristic value τ relative to the change in the slip ratio is large. Note that an example of processing in which the process of step S9 is omitted can also be employed.

In step S10, the ECU 100A determines whether the slip ratio has decreased as compared to that of the previous time. If the slip ratio has decreased, the process advances to step S11. If the slip ratio has not decreased, the process advances to step S5. FIG. 5 shows the decrease and increase in the slip ratio. In FIG. 5, $\tau_{n-1}$ represents the calculation result of the slip ratio of the previous time. If the calculation result of the slip ratio of this time is $\tau_n$, the slip ratio increases. The value τ decreases, and the calculation result of the load on the torque converter TC also decreases as compared to the previous time if the target engine speed is the same. If the calculation result of the slip ratio of this time is $\tau_n'$, the slip ratio decreases. The value τ increases, and the calculation result of the load on the torque converter TC also increases as compared to the previous time if the target engine speed is the same.

Referring back to FIG. 6, in step S11, the ECU 100A sets the load information of the previous time as the load information of this time. That is, dummy information that is not based on the input shaft rotation speed and the engine information acquired by the processes of steps S1 and S2 of this time is generated as the load information of this time.

In step S12, the ECU 100A transmits the load information of this time generated in step S7, S8, or S11 to the ECU 200A. The processing of one unit thus ends. In this embodiment, the processing is branched by the determination of step S10. Accordingly, as shown in FIG. 5, when the value τ changes from $\tau_{n-1}$ to $\tau_n$, the processes of step S5 and S7 are executed, and the change is reflected. On the other hand, when the value τ changes from $\tau_{n-1}$ to $\tau_n'$, the process of step S11 is executed, and the change is not reflected. In other words, in the region where the slip ratio exceeds the threshold TH, the ECU 200A is notified of a decrease in the load on the torque converter TC but not an increase in the load. Hence, transmission of the load information that increases the output torque of the engine EG is regulated. It is possible to prevent hunting of the engine speed described at the start, and it is possible to improve the stability of the engine speed in a state in which the load on the input shaft 10 is released.

Second Embodiment

Figure 7:
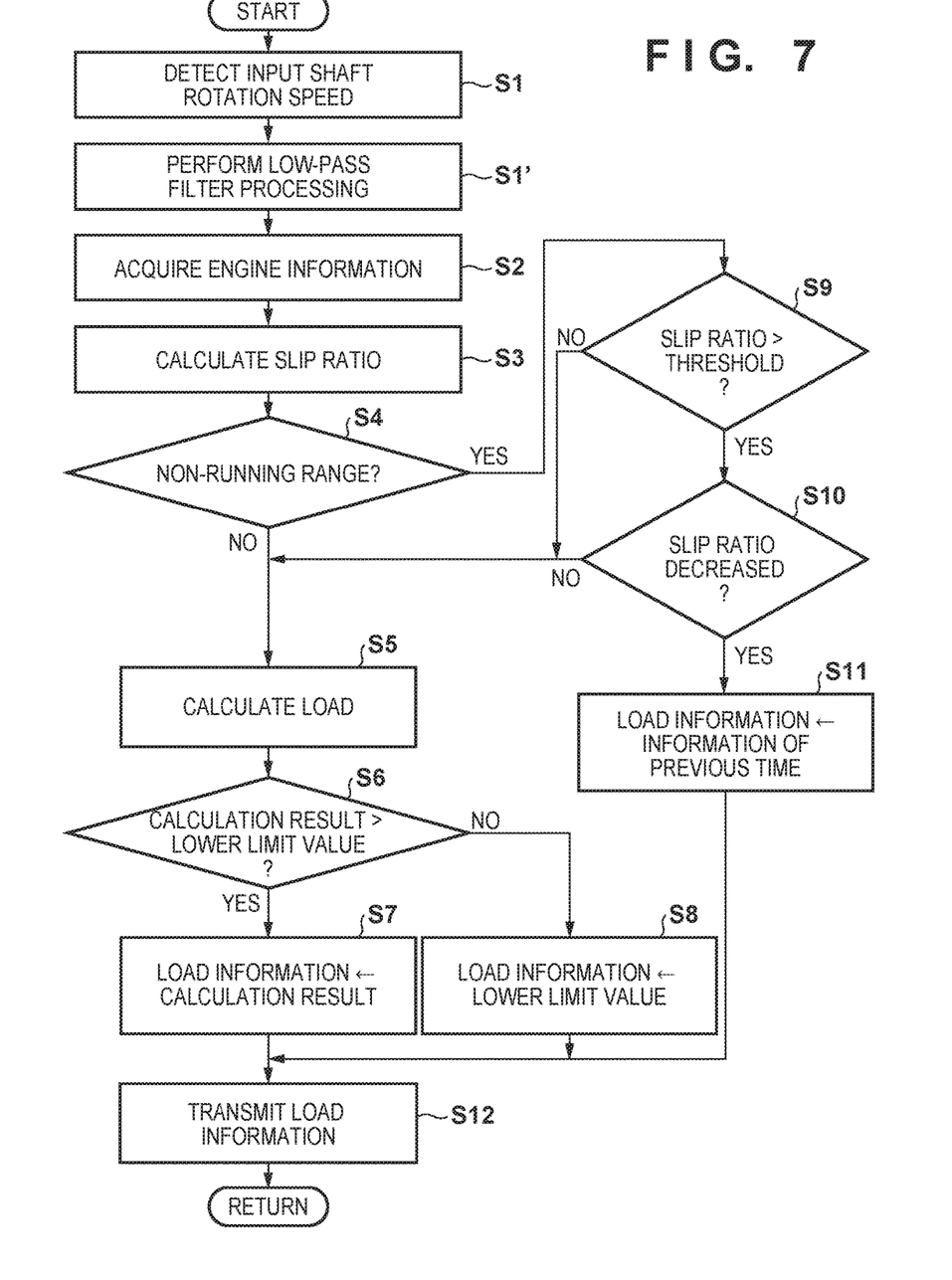
FIG. 7 is another flowchart showing an example of processing of the control apparatus shown in FIG. 4.

As a method of suppressing a variation in a characteristic value τ in a region where a slip ratio exceeds a threshold TH, a low frequency component may be extracted from the detection result of an input shaft rotation speed or the calculation result of the characteristic value τ, and the result may be used. The variation in the value thus becomes moderate, and as a result, the variation in the load on a torque converter TC represented by load information also becomes moderate, and the stability of the engine speed can further be improved. To extract the low frequency component, a low-pass filter can be used. In FIG. 7, processing of a low-pass filter is applied to the input shaft rotation speed in the example of processing shown in FIG. 6. Only points different from the example of processing shown in FIG. 6 will be described.

After the input shaft rotation speed is detected in step S1, low-pass filter processing is executed in step S1'. In the low-pass filter processing, for example, the value of the input shaft rotation speed of this time is decided based on the past values of the input shaft rotation speed stored in a storage unit 102 and the detection result of this time. The low-pass filter may be, for example, an IIR filter. In the processing from step S2, the processing is performed using the input shaft rotation speed to which the low-pass filter processing is applied in step S1'.

Third Embodiment

In the first embodiment, in FIG. 5, when the value τ changes from $\tau_{n-1}$ to $\tau_n$, the change is reflected, and when the value τ changes from $\tau_{n-1}$ to $\tau_n'$, the change is not reflected. In this embodiment, however, in a region where a slip ratio exceeds a threshold TH, the load on a torque converter TC is set to a fixed value, and dummy information is used as load information.

Figure 8:
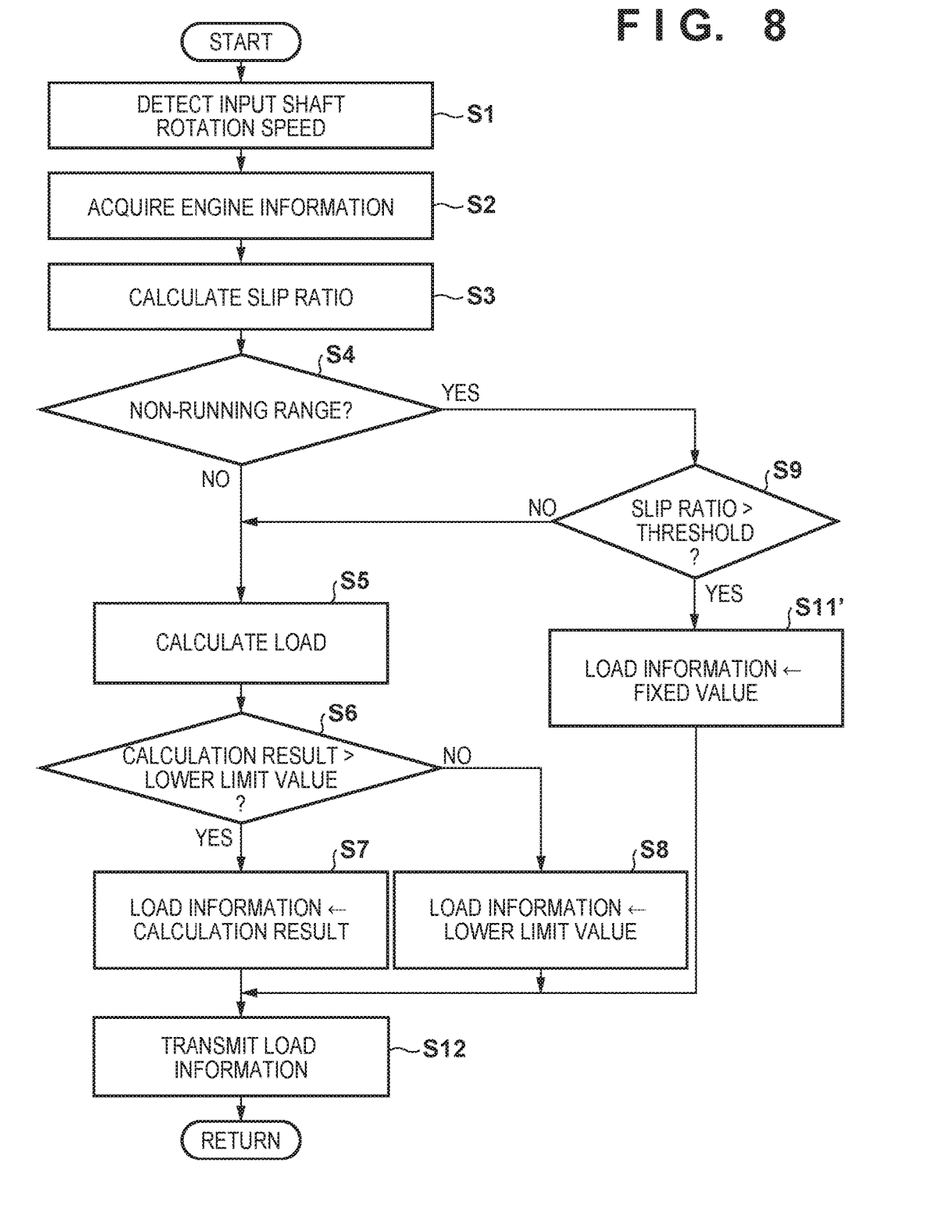
FIG. 8 is still another flowchart showing an example of processing of the control apparatus shown in FIG. 4.

FIG. 8 shows an example of processing in which in the example of processing shown in FIG. 6, the load on the torque converter TC is set to a fixed value in the region where the slip ratio exceeds the threshold TH. Only points different from the example of processing shown in FIG. 6 will be described. In step S9, it is determined whether the slip ratio calculated in step S3 exceeds the threshold. If the slip ratio exceeds the threshold, the process advances to step S11'. The determination of step S10 in FIG. 6 is not performed. In step S11', a predetermined fixed value is set to load information. In the region where the slip ratio exceeds the threshold TH, if the engine speed is the same, the fixed value is notified to an ECU 200A as the load on the torque converter TC, and the stability of the engine speed can be improved.

Other Embodiments

In the above-described examples, a case in which the torque converter TC is used is shown, and an example in which the load information represents the load on the torque converter TC is shown. However, the present invention is also applicable to a case in which another starting device is used. In addition, to calculate the load, the input shaft rotation speed is detected. However, depending on the calculation contents of the load, another parameter of the automatic transmission 1 may be detected and used in the calculation.

Summary of Embodiment

1. A control apparatus (for example, 100) according to the above embodiment is a control apparatus configured to control an automatic transmission (for example, 1) to which a driving force of an engine is input, comprising:
    a detection unit (for example, 111) provided in the automatic transmission; and
    a processing unit (for example, 100A) configured to generate load information concerning a load on the automatic transmission based on a detection result of the detection unit and transmit the load information to a control apparatus (for example, 200) of the engine,
    wherein the processing unit transmits dummy information that is not based on the detection result of the detection unit as the load information at least on condition that the automatic transmission is in an operation state in which a load on an input shaft (for example, 10) of the automatic transmission is released (for example, S11, S12).

According to this embodiment, transmission of the load information that increases the output torque of the engine can be regulated by the dummy information. It is therefore possible to improve the stability of the engine speed in a state in which the load on the input shaft is released.

2. In the above embodiment, the automatic transmission can select, as shift ranges, a running range in which the driving force is transmitted to a wheel side and a non-running range (for example, N, P) in which the driving force is not transmitted to the wheel side, and
    the operation state is a state in which the shift range of the automatic transmission is the non-running range (for example, S4).

According to this embodiment, in a transitional state in which the shift range is switched from the running range to the non-running range, the stability of the engine speed can be improved.

3. In the above embodiment, the dummy information is information that regulates an increase in the output torque of the engine.

According to this embodiment, transmission of the load information that increases the output torque of the engine can be regulated by the dummy information.

4. In the above embodiment, the dummy information is information transmitted as the load information at previous time of transmission (for example, S11).

According to this embodiment, transmission of the load information that increases the output torque of the engine can be regulated by the dummy information.

5. In the above embodiment,
    in a case in which the output torque of the engine is increased by the load information, the processing unit transmits the dummy information as the load information (for example, S11, S12), and
    in a case in which the output torque of the engine is decreased by the load information, the processing unit transmits the load information based on the detection result (for example, S7, S12).

According to this embodiment, since the dummy information is transmitted only when increasing the output torque of the engine, it is possible to perform engine control corresponding to the load on the automatic transmission while improving the stability of the engine speed.

6. In the above embodiment,
    the automatic transmission is an automatic transmission provided with a torque converter (for example, TC), and
    the load information is information concerning a load on the torque converter.

According to this embodiment, it is possible to perform engine control corresponding to the load on the torque converter while improving the stability of the engine speed.

7. In the above embodiment,
    the detection unit detects a rotation speed of the input shaft to which the driving force is input through the torque converter,
    the processing unit transmits the dummy information as the load information on condition that a slip ratio of the torque converter decreases (for example, S10), and
    in a case in which the slip ratio of the torque converter increases, the processing unit transmits the load information based on the detection result even if the automatic transmission is under the operation state in which the load on the input shaft is released (for example, S7, S12).

According to this embodiment, it is possible to perform engine control corresponding to the load on the torque converter while improving the stability of the engine speed.

8. In the above embodiment, the processing unit calculates, as the load information, a load value based on the rotation speed of the input shaft, an actual engine speed of the engine, and a target engine speed of the engine (for example, S5).

According to this embodiment, it is possible to perform driving control of the engine for the load on the automatic transmission side as feed forward control, and perform more proper driving control of the engine.

9. In the above embodiment, the apparatus comprises a low-pass filter (for example, S1') configured to extract a low frequency component from the detection result of the detection unit, and
    the processing unit generates the load information based on the low frequency component extracted by the low-pass filter (for example, FIG. 7).

According to this embodiment, it is possible to further improve the stability of the engine speed.

10. A control system according to the above embodiment is a control system comprising:
    a first control apparatus (for example, 200) configured to control an engine; and
    a second control apparatus (for example, 100) configured to control an automatic transmission to which a driving force of the engine is input,
    wherein the second control apparatus comprises:
    a detection unit (for example, 111) provided in the automatic transmission; and
    a processing unit (for example, 100A) configured to generate load information concerning a load on the automatic transmission based on a detection result of the detection unit and transmit the load information to the first control apparatus,
    the first control apparatus executes driving control of the engine based on the load information, and
    the processing unit transmits dummy information that is not based on the detection result of the detection unit as the load information at least on condition that the automatic transmission is in an operation state in which a load on an input shaft (for example, 10) of the automatic transmission is released (for example, S11, S12).

According to this embodiment, transmission of the load information that increases the output torque of the engine can be regulated by the dummy information. It is therefore possible to improve the stability of the engine speed in a state in which the load on the input shaft is released.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus configured to control an automatic transmission to which a driving force of an engine is input, comprising:
   a detection unit provided in the automatic transmission; and
   a processing unit configured to generate load information concerning a load on the automatic transmission based on a detection result of the detection unit and transmit the load information to a control apparatus of the engine,
   wherein the processing unit transmits dummy information that is not based on the detection result of the detection unit as the load information at least on condition that the automatic transmission is in an operation state in which a load on an input shaft of the automatic transmission is released.

2. The apparatus according to claim 1, wherein the automatic transmission can select, as shift ranges, a running range in which the driving force is transmitted to a wheel side and a non-running range in which the driving force is not transmitted to the wheel side, and
   the operation state is a state in which the shift range of the automatic transmission is the non-running range.

3. The apparatus according to claim 1, wherein the dummy information is information that does not increase an output torque of the engine.

4. The apparatus according to claim 1, wherein the dummy information is information transmitted as the load information at previous time of transmission.

5. The apparatus according to claim 3, wherein
   in a case in which the output torque of the engine is increased by the load information, the processing unit transmits the dummy information as the load information, and
   in a case in which the output torque of the engine is decreased by the load information, the processing unit transmits the load information based on the detection result.

6. The apparatus according to claim 1, wherein
   the automatic transmission is an automatic transmission provided with a torque converter, and
   the load information is information concerning a load on the torque converter.

7. The apparatus according to claim 6, wherein
   the detection unit detects a rotation speed of the input shaft to which the driving force is input through the torque converter,
   the processing unit transmits the dummy information as the load information on condition that a slip ratio of the torque converter decreases, and
   in a case in which the slip ratio of the torque converter increases, the processing unit transmits the load information based on the detection result even if the automatic transmission is under the operation state in which the load on the input shaft is released.

8. The apparatus according to claim 7, wherein the processing unit calculates, as the load information, a load value based on the rotation speed of the input shaft, an actual engine speed of the engine, and a target engine speed of the engine.

9. The apparatus according to claim 7, further comprising a low-pass filter configured to extract a low frequency component from the detection result of the detection unit,
   wherein the processing unit generates the load information based on the low frequency component extracted by the low-pass filter.

10. A control system comprising:
    a first control apparatus configured to control an engine; and
    a second control apparatus configured to control an automatic transmission to which a driving force of the engine is input,
    wherein the second control apparatus comprises:
    a detection unit provided in the automatic transmission; and
    a processing unit configured to generate load information concerning a load on the automatic transmission based on a detection result of the detection unit and transmit the load information to the first control apparatus,
    the first control apparatus executes driving control of the engine based on the load information, and
    the processing unit transmits dummy information that is not based on the detection result of the detection unit as the load information at least on condition that the automatic transmission is in an operation state in which a load on an input shaft of the automatic transmission is released.

* * * * *